(12) United States Patent
Peoples et al.

(10) Patent No.: US 9,158,838 B2
(45) Date of Patent: Oct. 13, 2015

(54) DETERMINING QUERY RETURN REFERENTS FOR CONCEPT TYPES IN CONCEPTUAL GRAPHS

(75) Inventors: Bruce E. Peoples, State College, PA (US); Michael R. Johnson, State College, PA (US); Michael M. Smith, Aaronsburg, PA (US)

(73) Assignee: Raytheon Company, Waltham, MA (US)

( * ) Notice: Subject to any disclaimer, the term of this patent is extended or adjusted under 35 U.S.C. 154(b) by 426 days.

(21) Appl. No.: 12/335,283

(22) Filed: Dec. 15, 2008

(65) Prior Publication Data
US 2010/0153369 A1 Jun. 17, 2010

(51) Int. Cl.
*G06F 17/30* (2006.01)
*G06F 7/00* (2006.01)

(52) U.S. Cl.
CPC .... *G06F 17/30657* (2013.01); *G06F 17/30731* (2013.01); *G06F 17/30734* (2013.01)

(58) Field of Classification Search
None
See application file for complete search history.

(56) References Cited

U.S. PATENT DOCUMENTS

| | | | |
|---|---|---|---|
| 4,964,063 A * | 10/1990 | Esch | 706/53 |
| 5,644,740 A * | 7/1997 | Kiuchi | 715/853 |
| 5,696,916 A * | 12/1997 | Yamazaki et al. | 715/853 |
| 6,076,088 A | 6/2000 | Paik et al. | |
| 6,169,986 B1 * | 1/2001 | Bowman et al. | 1/1 |
| 6,263,335 B1 | 7/2001 | Paik et al. | |
| 6,523,028 B1 * | 2/2003 | DiDomizio et al. | 707/748 |
| 6,678,677 B2 | 1/2004 | Roux et al. | |
| 6,847,979 B2 | 1/2005 | Allemang et al. | |
| 6,947,923 B2 * | 9/2005 | Cha et al. | 1/1 |
| 7,139,755 B2 * | 11/2006 | Hammond | 707/767 |
| 7,428,529 B2 * | 9/2008 | Zeng et al. | 1/1 |
| 7,493,253 B1 * | 2/2009 | Ceusters et al. | 704/9 |
| 7,539,619 B1 | 5/2009 | Seligman et al. | |
| 7,555,472 B2 | 6/2009 | Craig et al. | |
| 7,685,118 B2 | 3/2010 | Zhang | |
| 7,702,500 B2 * | 4/2010 | Blaedow | 704/9 |
| 7,761,298 B1 * | 7/2010 | Pereira et al. | 704/257 |
| 7,853,555 B2 | 12/2010 | Peoples et al. | |
| 7,882,143 B2 * | 2/2011 | Smyros et al. | 707/802 |
| 7,991,608 B2 | 8/2011 | Johnson et al. | |
| 8,386,489 B2 | 2/2013 | Peoples et al. | |
| 2002/0022955 A1 | 2/2002 | Troyanova et al. | |
| 2002/0087313 A1 | 7/2002 | Lee et al. | |

(Continued)

OTHER PUBLICATIONS

Sowa, John, "Conceptual Graphs for a Data Base Interface," Jul. 1976, IBM Journal of Research and Development, vol. 20, Issue 4, p. 336-357.*

(Continued)

*Primary Examiner* — Charles Adams
(74) *Attorney, Agent, or Firm* — Daly, Crowley, Mofford & Durkee, LLP

(57) ABSTRACT

In one embodiment, a method for determining query return referent data for concept types in a conceptual graph includes generating a conceptual graph for a document query, the conceptual graph comprising a plurality of graph terms, identifying one of more of the plurality of graph terms needing referent data, identifying conceptually similar terms for each of the graph terms, for the graph terms needing referents, identifying referent data by searching for instances where conceptually similar terms for graph terms needing referent data are associated by conceptually similar terms for the linking concept term, and associating identified referent data with the graph terms needing referent data.

20 Claims, 3 Drawing Sheets

(56) References Cited

U.S. PATENT DOCUMENTS

| | | | |
|---|---|---|---|
| 2002/0107844 A1 | 8/2002 | Cha et al. | |
| 2003/0049592 A1 | 3/2003 | Park | |
| 2003/0050915 A1 | 3/2003 | Allemang et al. | |
| 2003/0229497 A1 | 12/2003 | Wilson et al. | |
| 2004/0010483 A1* | 1/2004 | Brands et al. | 706/45 |
| 2004/0024739 A1 | 2/2004 | Copperman et al. | |
| 2004/0067471 A1 | 4/2004 | Bennett | |
| 2004/0093328 A1 | 5/2004 | Damle | |
| 2004/0236729 A1 | 11/2004 | Dingledine et al. | |
| 2005/0192926 A1 | 9/2005 | Liu et al. | |
| 2005/0278325 A1 | 12/2005 | Mihalcea et al. | |
| 2006/0074832 A1 | 4/2006 | Gardner et al. | |
| 2006/0184516 A1 | 8/2006 | Ellis | |
| 2006/0235843 A1* | 10/2006 | Musgrove et al. | 707/6 |
| 2007/0136251 A1* | 6/2007 | Colledge et al. | 707/3 |
| 2007/0294223 A1 | 12/2007 | Gabrilovich et al. | |
| 2008/0033932 A1 | 2/2008 | DeLong et al. | |
| 2008/0270138 A1 | 10/2008 | Knight et al. | |
| 2009/0171876 A1 | 7/2009 | Tirri | |
| 2009/0254543 A1 | 10/2009 | Ber et al. | |
| 2009/0259459 A1 | 10/2009 | Ceusters et al. | |
| 2010/0070449 A1 | 3/2010 | Arnold et al. | |
| 2010/0115003 A1 | 5/2010 | Soules et al. | |
| 2010/0121884 A1 | 5/2010 | Peoples et al. | |
| 2010/0153367 A1 | 6/2010 | Peoples et al. | |
| 2010/0153368 A1 | 6/2010 | Peoples et al. | |
| 2010/0161669 A1 | 6/2010 | Peoples et al. | |
| 2010/0223276 A1 | 9/2010 | Al-Shameri et al. | |
| 2010/0287179 A1 | 11/2010 | Peoples et al. | |
| 2011/0040774 A1 | 2/2011 | Peoples et al. | |

OTHER PUBLICATIONS

Lendaris, George. "Conceptual Graph Knowledge Systems as Problem Context for Neural Networks," Jul. 24-27, 1988, IEEE International Conference on Neutral Networks, vol. 1, p. 133-140.*

Hensman, Svetlana. "Construction of Conceptual Graph Representation of Texts," May 2, 2004, Proceedings of the Student Research Workshop at HLT-NAACL, pp. 49-54.*

Notice of Allowance dated Jul. 19, 2012; for U.S. Appl. No. 12/266,724; 8 pages.

Office Action dated Aug. 1, 2012; for U.S. Appl. No. 12/266,671; 18 pages.

Request for Continued Examination and Response to Final Office Action filed on Feb. 16, 2012; for Final Office Action dated Sep. 1, 2011; for U.S. Appl. No. 12/266,671; 13 pages.

Request for Continued Examination and Response to Final Office Action filed on Apr. 3, 2012; for Final Office Action dated Jan. 26, 2012; for U.S. Appl. No. 12/342,580; 10 pages.

Office Action dated Apr. 26, 2012; for U.S. Appl. No. 12/335,260; 17 pages.

Final Office Action dated Apr. 23, 2012; for U.S. Appl. No. 12/541,244; 29 pages.

Notice of Allowance and Issue Fee Due, U.S. Appl. No. 12/335,213, filed Dec. 15, 2008, pp. 1-16.

Office Action dated May 11, 2011; for U.S. Appl. No. 12/266,671; 11 pages.

Response filed Aug. 9, 2011; to Office Action dated May 11, 2011; for U.S. Appl. No. 12/266,671; 13 pages.

Office Action dated Sep. 16, 2011; for U.S. Appl. No. 12/266,617; 12 pages.

RCE and Response filed Nov. 16, 2011; to Office Action dated Sep. 16, 2011; for U.S. Appl. No. 12/266,617; 15 pages.

Response filed Feb. 16, 2012; to Office Action dated Sep. 16, 2011; for U.S. Appl. No. 12/266,617; 16 pages.

Office Action dated Mar. 15, 2011; for U.S. Appl. No. 12/266,724; 13 pages.

Response filed Jun. 10, 2011; to Office Action dated Mar. 15, 2011; for U.S. Appl. No. 12/266,724; 9 pages.

Final Office Action dated Sep. 1, 2011 for U.S. Appl. No. 12/266,724; 9 pages.

RCE with Response filed Nov. 30, 2011; for Office Action dated Sep. 1, 2011; for U.S. Appl. No. 12/266,724; 15 pages.

Office Action dated Jan. 9, 2012; for U.S. Appl. No. 12/266,724; 21 pages.

Response filed Mar. 15; to Office Action dated Jan. 9, 2012; for U.S. Appl. No. 12/266,724; 9 pages, 10 pages.

Office Action dated Aug. 5, 2011; for U.S. Appl. No. 12/342,580; 11 pages, 13 pages.

Response filed Nov. 7, 2011; to Office Action dated Aug. 5, 2011; for U.S. Appl. No. 12/342,580; 11 pages.

Final Office Action dated Jan. 26, 2012; for U.S. Appl. No. 12/342,580; 17 pages.

Office Action dated Aug. 2, 2011; for U.S. Appl. No. 12/335,260; 12 pages.

Response filed Nov. 2, 2011; for Office Action dated Aug. 2, 2011; for U.S. Appl. No. 12/335,260; 12 pages, 13 pages.

Office Action dated Jan. 20, 2012; for U.S. Appl. No. 12/335,260; 12 pages.

Response filed Mar. 22, 2012; for Office Action dated Jan. 20, 2012; for U.S. Appl. No. 12/335,260; 14 pages.

Office Action dated May 26, 2011; for U.S. Appl. No. 12/541,244; 24 pages.

Response filed Aug. 25, 2011; to Office Action dated May 26, 2011; for U.S. Appl. No. 12/541,244; 14 pages.

Final Office Action dated Sep. 21, 2011; for U.S. Appl. No. 12/541,244; 24 pages.

Office Action dated Dec. 30, 2012; for U.S. Appl. No. 12/541,244; 30 pages, Dec. 30, 2011; 24 pages.

Response filed Mar. 15, 2012; to Office Action dated Dec. 30, 2012; for U.S. Appl. No. 12/541,244; pages, 13 pages.

Response to Office Action dated Aug. 1, 2012; for U.S. Appl. No. 12/266,671, response filed Oct. 30, 2012, 16 pages.

Final Office Action dated Nov. 26, 2012; for U.S. Appl. No. 12/266,671, 15 pages.

RCE and Response to Final Office Action dated Nov. 26, 2012; for U.S. Appl. No. 12/266,671, response filed Feb. 25, 2013, 17 pages.

Notice of Allowance dated Apr. 11, 2013 for U.S. Appl. No. 12/266,671, 22 pages.

Petition to Withdraw from Issue and RCE with IDS filed Sep. 25, 2012; for U.S. Appl. No. 12/266,724, 10 pages.

Patent Withdrawal Notice, Decision on Petition Granted and new Notice of Allowance dated Oct. 3, 2012; for U.S. Appl. No. 12/266,724, 10 pages.

U.S. Appl. No. 12/335,213, filed Dec. 15, 2008, 33 pages.

Non-Final Office Action dated Feb. 3, 2011, for U.S. Appl. No. 12/335,213, filed Dec. 15, 2008, 15 pages.

Response to Non-Final Office Action dated Feb. 3, 2011, for U.S. Appl. No. 12/335,213, filed Dec. 15, 2008, 13 pages.

Final Office Action dated Jun. 16, 2011, for U.S. Appl. No. 12/335,213, filed Dec. 15, 2008, 26 pages.

RCE and Response to Final Office Action dated for U.S. Appl. No. 12/335,213, filed Dec. 15, 2008, 13 pages, Dated: Sep. 16, 2011.

Notice of Abandonment dated Nov. 26, 2012; for U.S. Appl. No. 12/335,260, 3 pages.

Notice of Abandonment dated Nov. 23, 2012; for U.S. Appl. No. 12/541,244, 2 pages.

M. Andrea Rodriguez, Max J. Egenhofer, Determining Semantic Similarity among Entity Classes from Different Ontologies, Presented by Yaoxuan Wang, USC Viterbi, School of Engineering, pp. 1-31.

RCE and Response to Final Office Action dated Nov. 30, 2011, U.S. Appl. No. 12/541,244, 16 pages.

Response to Office Action filed Mar. 30, 2015 for U.S. Appl. No. 12/342,580; 11 pages.

Notice of Allowance dated Apr. 7, 2015 for U.S. Appl. No. 12/342,580; 7 pages.

U.S. Appl. No. 12/342,580 Office Action dated Dec. 1, 2014, 18 pages.

* cited by examiner

DETERMINING QUERY RETURN REFERENTS FOR CONCEPT TYPES IN CONCEPTUAL GRAPHS

TECHNICAL FIELD

This invention relates generally to the field of information technology and management and more specifically to concept types in conceptual graphs.

BACKGROUND

A corpus of data may hold a large amount of information, yet finding relevant information may be difficult. Keyword searching is the primary technique for finding information. In certain situations, however, known techniques for keyword searching cannot find conceptually similar terms for concepts that the keywords represent.

SUMMARY OF THE DISCLOSURE

In accordance with the present invention, disadvantages and problems associated with previous techniques may be reduced or eliminated.

In another embodiment, a method for determining query return referent data for concept types in a conceptual graph includes generating a conceptual graph for a document query including a plurality of graph terms. One of more of the plurality of graph terms needing referent data are identified, and conceptually similar terms for each of the graph terms are identified for the graph terms needing referents. Referent data is identified by searching for instances where conceptually similar terms for graph terms needing referent data are associated by conceptually similar terms for the linking concept term. Identified referent data is associated with the graph terms needing referent data.

Certain embodiments of the invention may provide one or more technical advantages. A technical advantage of one embodiment may be that query return referents for concept types in concept graphs may be determined. In some embodiments, the query conceptual graph may include graph terms that represent concept types. Certain embodiments identify a set of terms conceptually similar to the graph terms. Conceptually similar terms for concept types needing referents may further be identified. A technical advantage of certain embodiments includes determining referents for specific concept types. Certain embodiments provide information necessary to discover instance information in a query return. Some embodiments provide for storage and use of referents determined. Another technical advantage of certain embodiments may include storing and using referents in future queries.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6, like numerals being used for like and corresponding parts of the various drawings.

Figure 1:
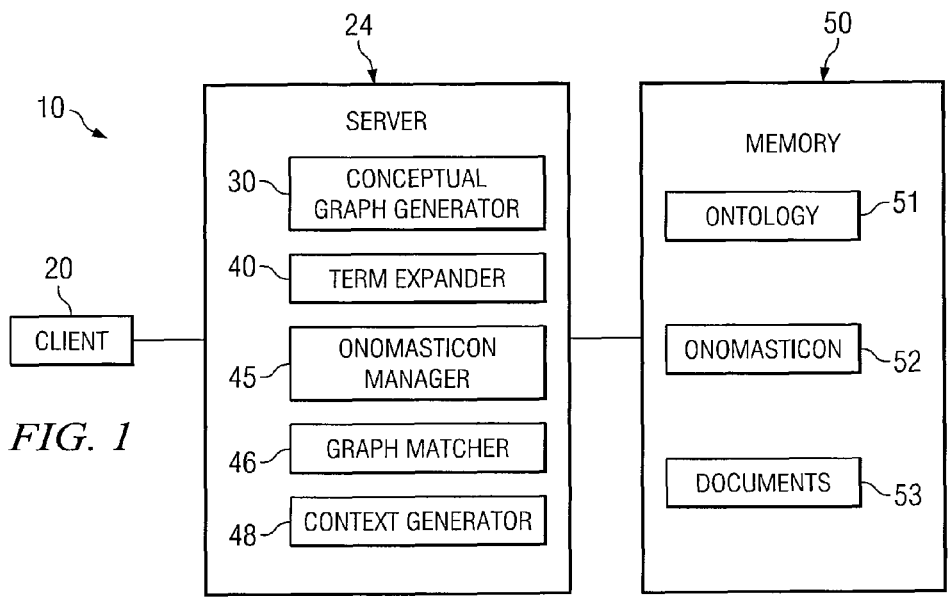
FIG. 1 illustrates one embodiment of a system configured to conceptually expand terms of conceptual graphs.

FIG. 1 illustrates one embodiment of a system 10 configured to determine query referents and/or query return referents for concept types in conceptual graphs. In certain embodiments, system 10 generates a query conceptual graph that may represent a search query. The query conceptual graph may include graph terms that represent concept types. A set of terms conceptually similar to the graph terms may be identified and used to perform a search. In certain embodiments, system 10 generates a document conceptual graph that may represent a document. The document conceptual graph may include graph terms that represent concept types. A set of terms conceptually similar to the graph terms may be identified and used to represent the document. The conceptually similar terms of a document may be compared with conceptually similar terms of a search. The document may be selected as a result of the search if the terms match.

In the illustrated embodiment, system 10 includes a client 20, a server 24, and a memory 50. Server 24 includes a conceptual graph generator 30, a term expander 40, an onomasticon manager 45, a graph matcher 46, and a context generator 48. Memory 50 includes an ontology 51, an onomasticon 52, and documents 53.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In particular embodiments, client 20 may send input to system 10 and/or receive output from system 10. In certain embodiments, client 20 may be a remote client communicating with system 10 through a network. In particular examples, a user may use client 20 to send input to system 10 and/or receive output from system 10. In particular embodiments, client 20 may provide output, for example, display, print, or vocalize output, reported by server 24, such as by term expander 30, conceptual graph generator 40, graph matcher 46 and/or context generator 48.

In particular embodiments, client 20 may send an input search query to system 10. An input search query may comprise any suitable message comprising one or more query terms that may be used to search for documents 53, such as a keyword query, or concept query based on keywords representing a concept. A term may comprise any suitable sequence of characters, for example, one or more letter, one or more numbers, and/or one or more other characters. An example of a term is a word.

Server 24 stores logic (for example, software and/or hardware) that may be used to perform the operations of system 10. In the illustrated example, server 24 includes term expander 40, conceptual graph generator 30, onomasticon manager 45, graph matcher 46, and context generator 48.

In particular embodiments, conceptual graph generator 30 generates a conceptual graph 60. A conceptual graph may be a graph that represents concept types expressed as terms (for example, specific instances of concept types) and the relationships among the concept types. An example of a conceptual graph is described with reference to FIG. 2A.

Figure 2A:
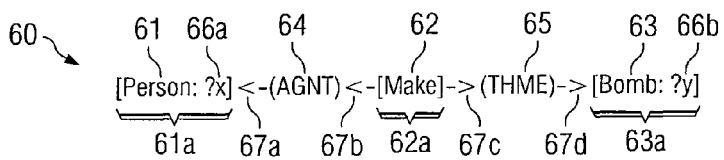
FIGS. 2A and 2B illustrate examples of a query conceptual graph and a document conceptual graph, respectively.

FIG. 2A illustrates an example of a conceptual graph 60. Conceptual graph 60 includes nodes, such as concept nodes 61a, 62a, and/or 63a and conceptual relation nodes 64 and/or 65, coupled by arcs 67 (67a, 67b, 67c, and/or 67d). The nodes include graph terms. A concept node 61a, 62a, and/or 63a represents a concept, and may include a concept type and a concept referent, which may be a specific instance of a concept type. The concept type may specify a concept, and the referent may designate a specific entity instance of the concept type.

In the illustrated example, concept node 61a includes concept type 61 "Person" and concept referent 66a "?x", which is an unknown concept referent. Concept node 62a includes concept type 62 "Make", but no concept referent. Concept node 63a includes concept type 63 "Bomb", and concept referent 66b "?y", which is an unknown concept referent. Concept types may be expressed as subjects, direct objects, verbs, or any suitable part of language. In the illustrated example, concept type 61 is a direct object represented by term "Person", concept type 62 is a verb represented by term "Make", and concept type 63 is a subject represented by term "Bomb". In some embodiments, "make" may be referred to as a "linking concept term" based on its function in the concept graph, and may provide a context between concept type "Person" and concept type "Bomb," for example, indicating a "person" "make" "bomb".

Conceptual relation nodes 64 and/or 65 represent relationships between concept nodes 61a, 62a, and/or 63a, and arcs 67 represent the direction of the relationships. In the illustrated example, conceptual relation node 64 "Agent" represents an agent relationship between concept nodes 61a and 62a. Arc 67a indicates that "Person:?x" is the agent of the action "Make". Conceptual relation node 65 "THME" represents a theme relation between concept nodes 62a and 63a. Arc 67d indicates that "Bomb:?y" is the theme of the action "Make".

In particular embodiments, the concepts and the relationships among the concepts of conceptual graph 60 may be expressed in text. In certain embodiments, square brackets may be used to indicate concept nodes 61a, 62a, and/or 63a, and parentheses may be used to indicate relation nodes 64 and/or 65. Hyphens and/or arrows may be used to indicate arcs 67. In the illustrated example, the concepts and relationships may be expressed as:

[Person: ?x]←(Agent)←[Make]→(THME)→[Bomb: ?y]

Referring back to FIG. 1, in particular embodiments, conceptual graph generator 30 may generate a document conceptual graph 300 for a document. An example of a document conceptual graph 300 is described in more detail with reference to FIG. 2B.

Figure 2B:
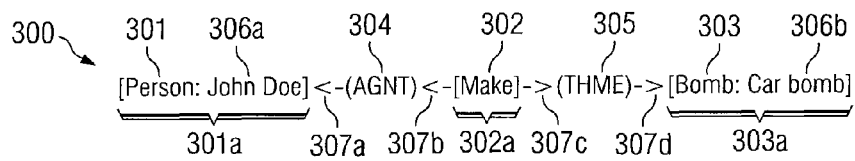

FIG. 2B illustrates an example of a document conceptual graph 300. In the illustrated example, document conceptual graph 300 includes nodes, such as concept nodes 301a, 302a, and/or 303a and conceptual relation nodes 304 and/or 305, coupled by arcs 307 (307a, 307b, 307c, and/or 307d). In the illustrated example, concept node 301a includes concept type 301 "Person" and concept referent 306a "John Doe". Concept node 302a includes concept type 302 "Make", but no concept referent. Concept node 303a includes concept type 303 "Bomb", and concept referent 306b "Car bomb".

In the illustrated example, conceptual relation node 304 "Agent" represents an agent relationship between concept nodes 301a and 302a. Arc 307a indicates that "Person: John Doe" is the agent of the action "Make". Conceptual relation node 305 "THME" represents a theme relation between concept nodes 302a and 303a. Arc 307d indicates that "Bomb: Car bomb" is the theme of the action "Make". In some embodiments, "Make" may be referred to as a "linking concept term" based on its function in the concept graph.

In the illustrated example, the concepts and relationships of document conceptual graph 300 may be expressed as:

[Person: John Doe]←(Agent)←[Make]→(Theme)→[Bomb: Car bomb]

In the illustrated example, document conceptual graph 300 may represent some or all of a retrieved document that includes information about "Person (specified as John Doe) "Makes" a "Bomb" (specified as Car bomb)."

Referring back to FIG. 1, conceptual graph generator 30 may perform other suitable operations. In particular embodiments, conceptual graph generator may include an entity extractor that can extract concept types and/or referents to construct graphs.

In particular embodiments, term expander 40 expands terms representing concept types of conceptual graph 60 and/or 300. Term expander 40 may expand the terms by identifying, for each term, a set of terms conceptually similar to the term. Term expander 40 may use an ontology 51 to identify the conceptually similar terms. A search query may be formed using the conceptually similar terms. Term expander 40 may include a Raytheon Semantic Reverse Query Expander, or other term expander. Term expander 40 may also include a logic engine for reasoning about terms and their suitability. An example of a logic engine may include Cyc.

Conceptually similar terms may be terms that are, for example, within the semantic context of each other. Examples of conceptually similar terms include synonyms, hypernyms, holonyms, hyponyms, merronyms, coordinate terms, verb participles, troponyms, and entailments. Conceptually similar terms may be in the native language of the search (for example, English) and/or a foreign language (for example, Arabic, French, or Japanese). In one embodiment, a foreign language term may be a foreign language translation of a native language term related to a conceptual graph.

A conceptually similar term (CST) of a term may be expressed as CST(term). For example, CST (Person) is Human.

In the illustrated example, examples of conceptually similar terms for query concept graph and/or 300 may be as follows:

CST(Person): Individual, Religious individual, Engineer, Warrior, etc.

CST(Make): Building, Build, Create from raw materials, etc.

CST(Bomb): Explosive device, Car bomb, Pipe bomb, etc.

The conceptually similar terms may include the following Arabic terms (English translation in parentheses):

CST(Person): شخص (Person), فرد (Individual), فرد دينية (Religious individual), المهندس (Engineer), الناس المحارب (Warrior), etc.

CST(Make): تقدم (Make), بناء (Building), يبني (Build), خلق من المواد الخام (Create from raw materials), etc.

CST(Bomb): قنبلة (Bomb), عبوة ناسفة (Explosive device), سيارة مفخخة (Car bomb), قنبلة انبوبية (Pipe bomb), etc.

In particular embodiments, onomasticon manager 45 manages onomasticon 52. Onomasticon manager 45 may manage information in onomasticons 52 by performing any suitable information management operation, such as storing, modifying, organizing, and/or deleting information. In particular embodiments, onomasticon manager 45 may perform the following mappings: a query conceptual graph to a search query, a set of conceptually similar terms to a concept type of a conceptual graph, a set of conceptually similar terms to a search query, a word sense of conceptually similar terms to a concept type, and/or a set of conceptually similar terms to a word sense. Onomasticon manager 45 may perform the operations at any suitable time, such as when information is generated or validated.

In particular embodiments, graph matcher 46 may compare query conceptual graphs 60 and document conceptual graphs 300 to see if graphs 60 and 300 match in order to select documents that match the search query. In particular embodiments, expanded document conceptual graphs 300 and expanded query conceptual graphs 60 may be compared.

Graphs may be regarded as matching if one, some, or all corresponding terms associated with the graphs match. Terms associated with a graph may include terms representing concept types of the graph and/or terms that are conceptually similar to the terms representing the concept types. Corresponding concept nodes may be nodes in the same location of a graph. For example, node 61a of graph 60 corresponds to node 301a of graph 300.

In the example, nodes 61a, 62a, 63a, 64, and/or 65 of conceptual graph 60 may match nodes 301a, 302a, 303a, 304, and/or 305 of conceptual graph 300 if the concept types and/or relations of nodes 61a, 62a, 63a, 64, and/or 65 match that of nodes 301a, 302a, 303a, 304, and/or 305, respectively. In the example, conceptual graphs 60 and 300 may be regarded as matching.

In particular embodiments, graph matcher 46 may validate a match using onomasticons 52. In certain examples, graph matcher 46 may determine whether conceptually similar terms of graphs 60 and 300 map to the same concept type in one or more onomasticons 52. If they do, the match may be regarded as valid. In certain examples, the conceptually similar terms of graphs 60 and 300 may be in the same or different onomasticons 52.

In particular embodiments, if a document conceptual graph 300 representing a document 53 matches query conceptual graphs 60, graph matcher 46 may select document 53 to report to client 20.

In particular embodiments, context generator 48 may be used to retrieve referents for concept types 301 and 303. Context generator 48 identifies concept type "Make" as a context between the concept types "Person" and "Bomb". In Memory 50, any concept types containing "Person" and "Bomb", or specific terms to represent these concept types, such as "Individual" for "Person" and "Package Bomb" for "Bomb", with the relationship "Make", or specific terms representing "Make" for example "Build", the referents, such as "John Doe" for concept type "Person", and "UPS Bomb" for concept type "Bomb" are mapped to the concept types 61 and 63 respectively in concept graph 60. The mapping is stored in Onomasticon 52 for possible use by graph matcher 46 or by system 10.

Memory 50 includes ontology 51, onomasticon 52, and documents 53. Ontology 51 stores terms, attributes of terms, word senses (or definitions) of terms, and relationships among the terms. Ontology 51 may be used (for example, by term expander 40) to determine the appropriate terms, attributes, and relationships. For example, ontology 51 may describe the semantically related terms of a term and the relationships that the term may have with other terms. Relationships may include such as synonyms, hypernyms, holonyms, hyponyms, merronyms, coordinate terms, verb participles, troponyms, and entailments. For example, ontology 51 may store the conceptually similar terms for "Person", "Make", and "Bomb" as described above. Ontology 51 may include one or more knowledge bases (KB), knowledge stores (KS) or databases (DB).

Figure 3:
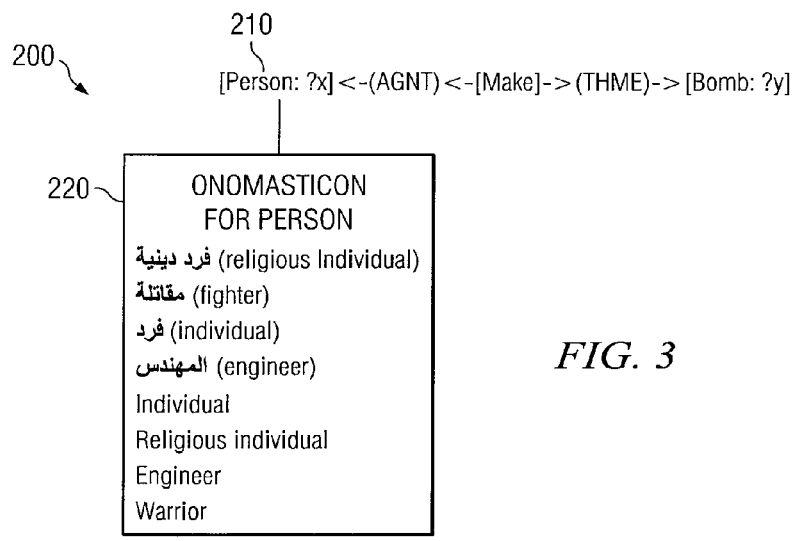
FIG. 3 illustrates an example of an onomasticon that includes terms associated with a query conceptual graph.
Figure 4:
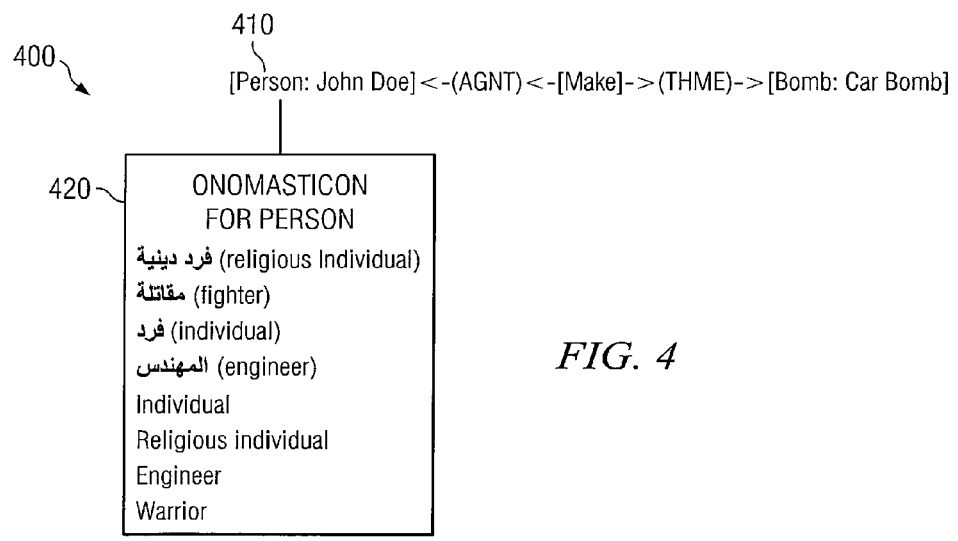
FIG. 4 illustrates an example of an onomasticon that includes terms associated with a document conceptual graph.

Onomasticon 52 records information resulting from the operations of system 10 in order to build a knowledge base of conceptually similar terms to represent concept types found in conceptual graphs. Onomasticon 52 may store mappings of the conceptually similar terms to the concept types. In particular embodiments, information in onomasticon 52 may be used for future searches. For example, term expander 40 may retrieve conceptually similar terms mapped to a term from onomasticon 52. FIGS. 3 and 4 illustrate examples of onomasticons 52.

FIG. 3 illustrates an example of an onomasticon 220 that may be used for a query conceptual graph 60. Onomasticon 220 stores conceptually similar English and foreign language terms, such as Arabic terms, for the concept type [Person] 210. These terms may include Individual, Religious individual, Engineer, Warrior, فرد (Individual), فرد دينية (Religious individual), المهندس (Engineer), and مقاتلة (Fighter).

FIG. 4 illustrates an example of an onomasticon 420 that may be used for a document conceptual graph 300. Onomasticon 420 stores conceptually similar English and foreign language terms, such as Arabic terms, for the concept type [Person] 410. These terms may include Individual, Religious individual, Engineer, Warrior, فرد (Individual), دينية فرد (Religious individual), المهندس (Engineer), and مقاتلة (Fighter).

Referring back to FIG. 1, a document 53 may refer to a collection of terms (such as words), and may be stored electronically. Documents 53 may include documents in a native language and/or a foreign language.

In the operation of system 10, sometimes referents to concept types and term representations for concept types (e.g., conceptually similar terms) in query conceptual graphs may be left undefined. For an exact query of a specific instance of a concept, referent information may be needed to discover instance information in a potential query return. Accordingly, some embodiments provide for determining referents for specific concept types.

Similarly, sometimes referents to concept types and term representations for concept types in query return conceptual graphs may be left undefined. For an exact match of a query referent and referent in a query return, referents in a potential query return must be determined. Accordingly, certain embodiments provide for determining referents for specific concept types in a query return. Embodiments also provide for storage and future use of determined referents by system 10, such as to match query with information in query returns, execute future queries, and/or discover specific instances of concepts.

Figure 5:
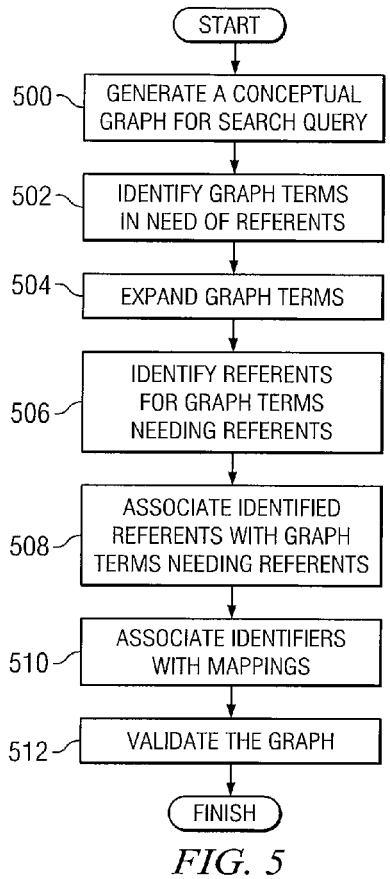
FIG. 5 illustrates an example of a method for determining query referents for concept types in conceptual graphs.

FIG. 5 illustrates an example of a method for determining referents of a query concept type utilizes term expander 40 and conceptual graph generator 30 to create a conceptual graph and expand concept types.

At step 500, a conceptual graph for a search query may be generated by system 10. The graph may be generated automatically, or in response to a user input. For example, the generated query conceptual graph may be:

[Person: ?x]←(AGNT)←[Make]→(THME)→[Bomb: ?y]

At step 502, graph terms in need of referents are identified. The identification may be performed based on properties of the conceptual graph, either automatically or by a user. Additionally, a context may be assigned to the concept types contained in all possible conceptual graphs produced by conceptual graph generator 30 by context generator 48. For example, in the above example, "make" is identified as the prime linking concept, linking the concept object types "person" and "bomb." In this example, "Person:?X" and "Bomb:?Y" are identified as concept type objects in need of referents. Note that "prime linking concept" and "prime linking object" are used interchangeably in the disclosure.

At step 504, graph terms are expanded. Expanded concept types may be generated for each node. For example, "person" may be expanded to "individual," "religious person," "human," and "warrior." "Make" may be expanded to "made," "create," "build," and "assemble." "Bomb" may be expanded to "explosive device," "car bomb," and "package bomb." Terms may be expanded by referencing mappings in onomasticon 52, or by other appropriate methods, such as by utilizing ontology 51. The expanded terms that represent the concept types in conceptual graphs are stored along with mapping information in onomasticon 52. Onomasticon 52 may store terms and their mappings to concept types in specific concept graphs.

Expansion may require identifying term representations or conceptually similar terms for a term. Conceptually similar terms for a term may be identified by determining a semantic sense for each graph term and the linking concept identifying the conceptually similar terms in accordance with the semantic senses. The semantic sense may be determined from the meaning of the term or terms. For example, conceptual graph generator 30 reports terms representing concept types of conceptual graph 200 to term expander 40. Term expander 40 retrieves word sense options for one or more terms from ontology 51. A word sense may indicate the use of a term in a particular semantic context. In the example, for the term "bomb", the word sense options may include "to bomb a test" and "to detonate a bomb." A word sense may be selected from the word sense options automatically or by a user. A selected word sense is received by term expander 40, and onomasticon manager 45 may map the selected word sense to the concept type and store the mapping in onomasticon 52. Term expander 40 may report conceptually similar term options based on the selected word sense. In some embodiments, the conceptually similar term options may be retrieved from onomasticon 52. In the example, the similar terms "bomb" may include "Bomb" may be expanded to "explosive device," "car bomb," and "package bomb." One or more conceptually similar terms may be selected (by a user or automatically) from the conceptually similar term options. Conceptually similar terms may include foreign language terms comprising a foreign language translations of a native language term conceptually similar to the search query.

In certain embodiments, mapping information for expanded terms is updated or otherwise modified. For example, Mapping information in onomasticon 52 for expanded prime linking concept terms (e.g., term representations of "make") is appended or modified to identifying the terms as "prime linking concepts." For example, "make" may be expanded to "made," "create," "build," and "assemble." Mapping information for each of those expanded terms is modified so that each terms is identified as a "prime linking concept." Similarly, mapping information in onomasticon 52 for expanded concept type object terms (e.g., terms representations for "individual" and "package bomb") is appended to identify each term as a "concept types in need of referents."

At step 506, referents for graph term in need of referents are identified. Referents may be identified, for example, by searching for instances where conceptually similar terms for graph terms in need of referents are associated by conceptually similar terms for the linking concept term.

In certain embodiments, mapping information for terms representing "make" in onomasticon 52 may be appended or modified to identify such terms as "prime linking context." Mapping information for terms representing "person" and "bomb" may be appended or modified to identify the terms as "concept type objects in need of referents."

Each term representation of a concept type object in need of referents contained in onomasticon 52 may be used to search ontology 51 for matching nodes or elements. Terms representing the concept type identified as the prime linking concept (in the example above, "make"), are used to search relationship data in ontology 51. When term representations for concept types in need of referents are identified and found to be associated with contain term representations for concept types for the prime context linking concept as a relationship, instance data in ontology 51 is retrieved. In certain embodiments, term representations for concept types needing referents are identified, and ontology 51 is searched for matches wherein term representations for the linking concepts are associated with the term representations for the concept types. For each match, instance data may be retrieved.

For example, "package bomb" is a term representation for concept type object "bomb." "Individual" is a term representation for concept type object "person." The concept types objects are linked by the linking concept term "make." If ontology 51 contains nodes "package bomb" and "individual," and "package bomb" has an "is made by" linking relationship to "individual," instance data for "package bomb" and "individual" would be retrieved. For example, "unibomber" may be instance data for "individual," and "UPS package" may be instance data for "package bomb." The instance data would be considered referents for concept types in conceptual graphs. The resulting conceptual graph with referents might be:

[individual: unibomber]←(AGNT)←[Made]→(THME)→[Package bomb: UPS package]

At step 508, identified referents may be associated with the graph terms in need of referents. For example, mappings in onomasticon 52 associated with "individual" and "package bomb" may be updated with referent data. In the example, "unibomber" and "package bomb" mappings may be updated to include "individual" and "package bomb," respectively. In some embodiments, mapping information may utilize a binding of system choice (e.g., XML, RDF, RDFS, OWL Lite, Full OWL, KIF, DAML, OIL, DAML+OIL, etc.).

At step 510, identifiers may be associated with the mappings or instance data. For example, mapping information in onomasticon 52 for all referents representation(s) stored may include a unique ID of the query (e.g., obtained from term expander 40), a unique ID of the conceptual graph (e.g., obtained conceptual graph generator 30), a unique ID of the concept type (e.g., obtained from conceptual graph generator 30), a unique ID of the term representing the concept type (e.g., obtained from onomasticon 52), and/or the unique ID of the query return (e.g., obtained from a data store containing the query return).

At step 512, the conceptual graph may be validated based on the identified referents. In certain embodiments, a logic engine may be used to determine the validity of conceptual graphs by utilizing referents. If the logic engine determines a conceptual graph is invalid for any referents of concept types within the conceptual graph, the referents and/or any mapping information such as unique IDs described above may be removed from onomasticon 52.

Modifications, additions, or omissions may be made to the method without departing from the scope of the invention. The method may include more, fewer, or other steps. Additionally, steps may be performed in any suitable order.

Figure 6:
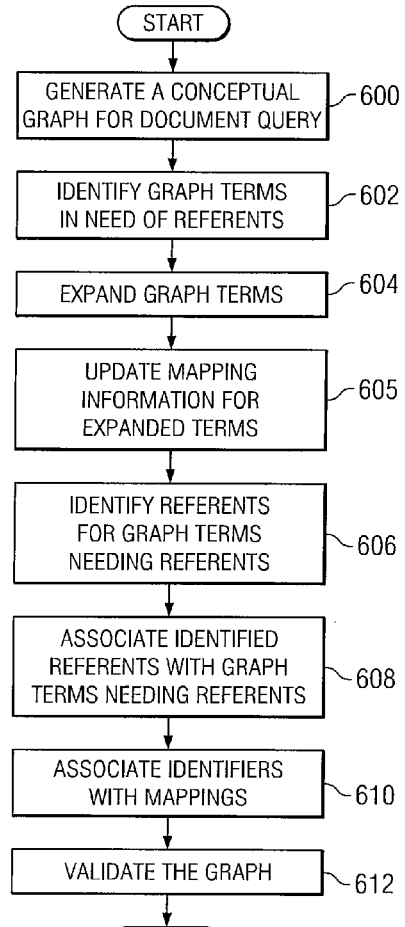
FIG. 6 illustrates an example of a method for determining query return referents for concept types in conceptual graphs.

FIG. 6 illustrates a method for determining referents of query return concept types utilizes term expander 40 and conceptual graph generator 30 to create a conceptual graph and expand concept types.

At step 600, a conceptual graph is generated from one or more documents returned from a query. An entity extractor (e.g., NetOwl) may be utilized to extract referents to the conceptual graphs generated by the conceptual graph generator 30. For example, a conceptual graph generated from returned documents may be:

[Individual:?x]←(AGNT)←[Make]→(THME)→
[Package Bomb:?y]

Specific instance data may be extracted from the document related to the concept type in the conceptual graph and/or the terms representing concept types.

At step 602, graph terms in need of referents are identified. As explained in reference to FIG. 5, a context may be assigned to the concept types contained in all possible conceptual graphs produced by a conceptual graph generator 30. Thus, "make" is identified as the prime linking concept, linking the concept type objects "individual" and "package bomb." Additionally, "individual: ?x" and "package bomb: ?y" are identified as concept type objects in need of referents.

At step 604, graph terms are expanded. As explained above with reference to FIG. 5, terms may be expanded by identifying a semantic sense and/or conceptually similar terms. The concept types in the graph, including the prime linking concept, may be expanded. For example, "individual" may be expanded to "person," "religious person," "human," and "warrior." "Make" may be expanded to "made," "create," "build," and "assemble." "Bomb" may be expanded to "explosive device," "car bomb," and "package bomb." Terms may be expanded by referencing mappings in onomasticon 52, or by other appropriate methods, such as by utilizing ontology 51. The expanded terms that represent the concept types in conceptual graphs may be stored along with mapping information in onomasticon 52. Onomasticon 52 may store terms and their mappings to concept types in specific concept graphs. Expansion details discussed above in reference to FIG. 5 are applicable.

At step 605, mapping information for expanded terms is updated or otherwise modified. For example, Mapping information in onomasticon 52 for expanded prime linking concept terms (e.g., term representations of "make") is appended or modified to identifying the terms as "prime linking concepts." For example, "make" may be expanded to "made," "create," "build," and "assemble." Mapping information for each of those expanded terms is modified so that each terms is identified as a "prime linking concept." Similarly, mapping information in onomasticon 52 for expanded concept type object terms (e.g., terms representations for "individual" and "package bomb") is appended to identify each term as a "concept types in need of referents."

At step 606, referents for graph terms needing referents are identified. Each concept type in need of referents and prime linking concept term contained in onomasticon 52 is used to retrieve instance data from the query returns. Referents may be identified by searching documents for instances where conceptually similar terms for graph terms in need of referents are associated by conceptually similar terms for the linking concept term.

For example, assume that "package bomb" and "individual" are concept type objects contained in a query return, and "make" is a prime linking concept term in the query return. Conceptual graph generator 30 searches documents 53 for any "make" or term representation for the concept type "make" as a linking relationship between the concept type objects "individual" and "package bomb." If the relationship exists, the conceptual graph generator 30 extracts the relevant instance data and includes the instance data in a conceptual graph. For example, if conceptual graph generator 30 found "unibomber" as an instance of "individual" in a query return document and also found "UPS package" as an instance of "package bomb" in the query return document, a resulting conceptual graph with referents would be:

[Individual: Unibomber]←(AGNT)←[Made]→
(THME)→[Package bomb: UPS package]

At step 608, identified referents are mapped or otherwise associated with graph terms needing referents. Mappings in onomasticon 52 for "individual" and "package bomb" may be updated accordingly. In the example, "Unibomber" and "UPS package" mappings may be updated to include "individual" and "package bomb," respectively. Mapping information in onomasticon 52 for all referents representation(s) stored may include a unique ID of the query (e.g., obtained from term expander 40), a unique ID of the conceptual graph (e.g., obtained conceptual graph generator 30), a unique ID of the concept type (e.g., obtained from conceptual graph generator 30), a unique ID of the term representing the concept type (e.g., obtained from onomasticon 52), and/or the unique ID of the query return (e.g., obtained from a data store containing the query return). In some embodiments, mapping information may utilize a binding of system choice (e.g., XML, RDF, RDFS, OWL Lite, Full OWL, KIF, DAML, OIL, DAML+OIL, etc.).

At step 610, identifiers may be associated with the mappings or instance data. For example, mapping information in onomasticon 52 for all referents representation(s) stored may include a unique ID of the query (e.g., obtained from term expander 40), a unique ID of the conceptual graph (e.g., obtained conceptual graph generator 30), a unique ID of the concept type (e.g., obtained from conceptual graph generator 30), a unique ID of the term representing the concept type (e.g., obtained from onomasticon 52), and/or the unique ID of the query return (e.g., obtained from a data store containing the query return).

At step 612, the updated graph, or other graphs, may be validated based on the updated referent mappings. Certain embodiments utilize a logic engine to determine the validity of a graph. A logic engine such as Cyc may be utilized, or any suitable method for validation.

Modifications, additions, or omissions may be made to the method without departing from the scope of the invention. The method may include more, fewer, or other steps. Additionally, steps may be performed in any suitable order.

Although FIG. 5 and FIG. 6 are discussed individually, many concepts, processes, and methods are common to each, and certain portions described with reference to one may also apply to the other. Also note that although English language examples are utilized above in various embodiments, certain embodiments provide for determining referents of a query concept type in foreign languages. Such embodiments may include a translator and various foreign language data.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, implemented in a computer, for determining query return referent data for concept types in a conceptual graph, the computer comprising a processor and a first memory configured to store a plurality of instructions executable by the processor to implement the method, wherein the method comprises:

generating a conceptual graph for a document query, the conceptual graph comprising a plurality of graph terms;

identifying, in the conceptual graph, at least a first respective graph term having unknown referent data, the unknown referent data comprising an unknown specific instance of a respective concept type associated with the first respective graph term having unknown referent data;

identifying, for the first respective graph term having unknown referent data, at least a second respective graph term that corresponds to a linking concept term in the conceptual graph, wherein the identification of the linking concept term is based at least in part on determining a function of the second respective graph term in the conceptual graph, wherein the second respective graph term is identified as the linking concept term if the second respective graph term functions to provide a context and relationship between the first respective graph term having unknown referent data and at least a third graph term;

accessing a first knowledge base comprising a plurality of mappings of conceptually similar terms to the graph terms in the conceptual graph;

identifying, based at least in part on information in the plurality of mappings, conceptually similar terms for each of the graph terms in the conceptual graph;

for at least the first respective graph term having unknown referent data, modifying a corresponding mapping to the first respective graph term having unknown referent data in the first knowledge base, to identify the first respective graph term having unknown referent data as being a first respective graph term having unknown referent data that is in need of at least respective potential referent data;

for at least the second respective graph term, modifying a corresponding mapping to the second respective graph term in the first knowledge base, to identify the second respective graph term as the linking concept term;

for at least the first respective graph term having unknown referent data, identifying respective potential referent data to be added to the conceptual graph by searching the first knowledge base, using the modified mappings to the first and second graph terms, respectively, for instances where conceptually similar terms to the first respective graph term having unknown referent data are associated, in at least one other mapping, with conceptually similar terms for the linking concept term, wherein respective potential referent data that has been identified is referred to as respective identified potential referent data;

associating, in the modified mapping for the first respective graph term having unknown referent data, the respective identified potential referent data with the first respective graph term having unknown referent data; and validating the conceptual graph based at least in part on analyzing a validity of each respective identified potential referent data.

2. The method of claim 1, wherein: the plurality of graph terms includes at least a first object concept and a second object concept; and the first object concept and the second object concept are associated by the linking concept term.

3. The method of claim 2, wherein identifying conceptually similar terms for each of the graph terms comprises:

identifying a first set of conceptually similar terms for the first object concept;

identifying a second set of conceptually similar terms for the second object concept; and identifying a third set of conceptually similar terms for the linking concept term.

4. The method of claim 3, wherein identifying first respective potential referent data for the first respective graph term having unknown referent data comprises:

accessing a second knowledge base comprising a plurality of documents; and identifying a document in the second knowledge base that contains an instance wherein a term from the first set of conceptually similar terms is associated with a term from the second set of conceptually similar terms by a term from the third set of conceptually similar terms.

5. The method of claim 3, further comprising:

modifying corresponding mappings, in the first knowledge base, for each respective term in the first set of conceptually similar terms, to include an indication that the respective term in the first set of conceptually similar terms is associated with a respective first object concept having unknown referent data;

modifying corresponding mappings, in the first knowledge base, for each respective term in the second set of conceptually similar terms, to include an indication that the respective term in the second set of conceptually similar terms is associated with a respective second object concept having unknown referent data; and modifying corresponding mappings, in the first knowledge base, for each respective term in the third set of conceptually similar terms, to include an indication that the respective term in the third set of conceptually similar terms is associated with a respective linking concept;

wherein at least a portion of the modified mappings is used to identify the respective potential referent data.

6. The method of claim 1, further comprising storing a unique identifier for the document query and a unique identifier for a document associated with corresponding-instance data.

7. The method of claim 1, wherein, if either the conceptual graph or the respective identified potential referent data is not validated, removing the association between the respective identified potential referent data and the respective graph term having unknown referent data, from the mapping for the first respective graph term having unknown referent data.

8. The method of claim 1, wherein identifying one or more conceptually similar terms for the graph terms comprises:
  determining a semantic sense for each graph term; and
  identifying the conceptually similar terms in accordance with the semantic senses.

9. The method of claim 1, wherein a set of conceptually similar terms comprises at least one foreign language term comprising a foreign language translation of a native language term conceptually similar to the search query.

10. The method of claim 1, wherein associating the respective identified potential referent data with the respective graph terms having unknown referent data comprises updating mapping information in an onomasticon.

11. A system for determining query return referent data for concept types in a conceptual graph, the system comprising:
  a memory in operable communication with a processor, the memory configured to store a first knowledge base; an
  logic stored in one or more nontransitory, computer-readable, tangible media that are in operable communication with the processor, the logic configured to store a plurality of instructions that, when executed by the processor, are configured to:
    generate a conceptual graph for a document query, the conceptual graph comprising a plurality of graph terms;
    identify, in the conceptual graph, at least a first respective-graph term having unknown referent data, the unknown referent data comprising an unknown specific instance of a respective concept type associated with the first respective graph term having unknown referent data;
    identify, for the first respective-graph term having unknown referent data, at least a second respective graph term that corresponds to a linking concept term in the conceptual graph, wherein the identification of the linking concept term is based at least in part on determining a function of the second respective graph term in the conceptual graph, wherein the second respective graph term is identified as the linking concept term if the second respective graph term functions to provide a context and relationship between the first respective graph term having unknown referent data and at least a third graph term;
    access, in the first knowledge base, a plurality of mappings of conceptually similar terms to the graph terms in the conceptual graph;
    identify, based at least in part on information in the plurality of mappings, conceptually similar terms for each of the graph terms in the conceptual graph;
    for at least the first respective graph term having unknown referent data, modify a corresponding mapping to the first respective graph term having unknown referent data in the first knowledge base, to identify the first respective graph term having unknown referent data as being a first respective graph term having unknown referent data in need of at least respective potential referent data;
    for at least the second respective graph term, modifying a corresponding mapping to the second respective graph term in the first knowledge base, to identify the second respective graph term as the linking concept term;
    for at least the first respective graph term having unknown referent data, identify respective potential referent data to be added to the conceptual graph by searching the first knowledge base, using the modified mappings to the first and second graph terms, respectively, for instances where conceptually similar terms to the first respective graph term having unknown referent data are associated, in at least one other mapping, with conceptually similar terms for the linking concept term, wherein respective potential referent data that has been identified is referred to as respective identified potential referent data;
    associate, in the mapping for the first-respective graph term having unknown referent data, the respective identified potential referent data with the first respective graph term having unknown referent data; and
    validate the conceptual graph based at least in part on analyzing a validity of each respective identified potential referent data.

12. The system of claim 11, wherein: the plurality of graph terms includes at least a first object concept and a second object concept; and the first object concept and the second object concept are associated by a linking concept term.

13. The system of claim 12, wherein identifying conceptually similar terms for each of the graph terms comprises:
  identifying a first set of conceptually similar terms for the first object concept;
  identifying a second set of conceptually similar terms for the second object concept; and
  identifying a third set of conceptually similar terms for the linking concept term.

14. The system of claim 13, wherein identifying respective potential referent data for the first respective graph term having unknown referent data comprises:
  accessing a second knowledge base comprising a plurality of documents; and
  identifying a document in the second knowledge base that contain an instance wherein a term from the first set of conceptually similar terms is associated with a term from the second set of conceptually similar terms by a term from the third set of conceptually similar terms.

15. The system of claim 13, wherein the instructions further configure the processor to:
  modify corresponding mappings in the first knowledge base, for each respective term in the first set of conceptually similar terms, to include an indication that the respective term in the first set of conceptually similar terms is associated with a respective first object concept having unknown referent data;
  modify corresponding mappings, in the first knowledge base, for each respective term in the second set of conceptually similar terms to include an indication that the respective the term in the second set of conceptually similar terms is associated with a respective second object concept having unknown referent data; and
  modify corresponding mappings, in the first knowledge base, for each respective term in the third set of conceptually similar terms to include an indication that the respective term in the third set of conceptually similar terms is associated with a respective linking concept, wherein at least a portion of the modified mappings is used to identify the respective potential referent data.

16. The system of claim 11, the logic further operable to: store a unique identifier for the document query and a unique identifier for a document associated with corresponding instance data.

17. The system of claim 11, wherein, if either the conceptual graph or the respective identified potential referent data is not validated, the instructions further configure the processor to remove the association between the respective identified potential referent data and the respective graph term having unknown referent data, from the mapping for the first respective graph term having unknown referent data.

18. The system of claim 11, wherein identifying one or more conceptually similar terms for the graph terms comprises:
- determining a semantic sense for each graph term; and
- identifying the conceptually similar terms in accordance with the semantic senses.

19. The system of claim 11, wherein a set of conceptually similar terms comprises at least one foreign language term comprising a foreign language translation of a native language term conceptually similar to the search query.

20. The system of claim 11, wherein associating the respective identified potential referent data with the respective graph terms having unknown referent data comprises updating mapping information in an onomasticon.

* * * * *